May 26, 1953　　　C. C. CALKINS　　　2,639,836
SEED TREATER

Filed March 27, 1950　　　　　　　　　5 Sheets-Sheet 1

INVENTOR.
Claude C. Calkins
BY
Grush Wells
ATTY.

May 26, 1953 — C. C. CALKINS — 2,639,836
SEED TREATER

Filed March 27, 1950 — 5 Sheets-Sheet 2

May 26, 1953     C. C. CALKINS     2,639,836
SEED TREATER

Filed March 27, 1950     5 Sheets-Sheet 3

INVENTOR.
Claude C. Calkins
BY Gruk Wells
Atty.

May 26, 1953  C. C. CALKINS  2,639,836
SEED TREATER
Filed March 27, 1950  5 Sheets-Sheet 4
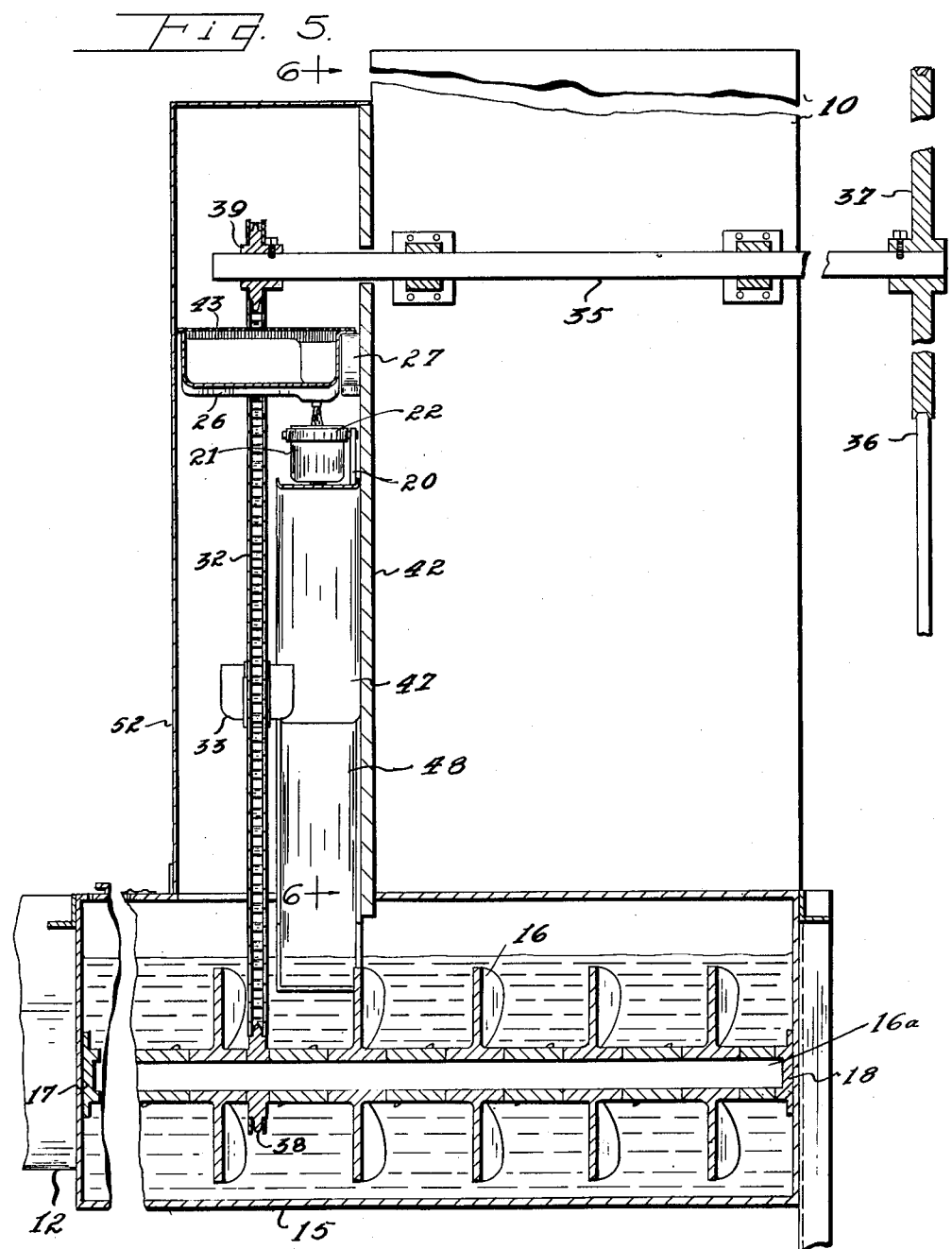
INVENTOR.
Claude C. Calkins
BY
Fred Wells
Atty May 26, 1953  C. C. CALKINS  2,639,836
SEED TREATER
Filed March 27, 1950  5 Sheets-Sheet 5
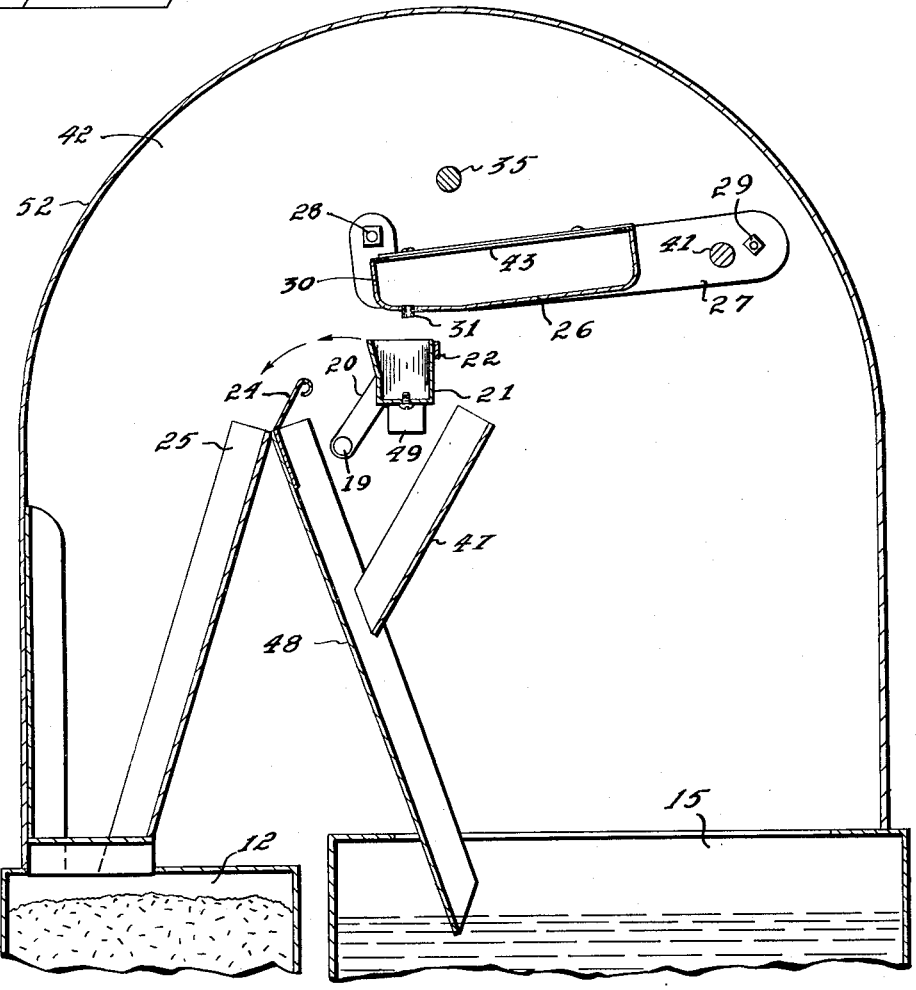
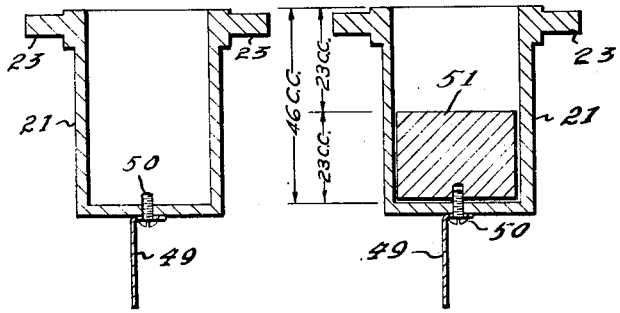
INVENTOR.
Claude C. Calkins
BY Greek Wells
Atty.

Patented May 26, 1953

2,639,836

UNITED STATES PATENT OFFICE 2,639,836

SEED TREATER

Claude C. Calkins, Spokane, Wash., assignor to Calkins Manufacturing Company, Spokane, Wash.

Application March 27, 1950, Serial No. 152,217

5 Claims. (Cl. 222—227)

The present invention relates to improvements in a seed treater.

It is the principal purpose of this invention to provide an improved and simplified mechanism for lifting a liquid containing seed treating chemicals (slurry) from a supply tank and supplying it in excess to a metering container that is in turn emptied into a treating chamber at a rate determined by the rate of feeding the seed to be treated into the chamber.

The seed treating chemicals are, generally, finely divided solids which are kept suspended in liquid by continuous agitation. Some tend to settle out if not agitated and many of them tend to foam. The present invention provides a simple effective means to maintain a continuous flow of slurry to the metering container and to return the excess slurry to the tank where it is agitated without pumps, valves, pipes or hose. The same means that drives the slurry agitator carries the slurry to a supply pan that directs a stream down to the filling position of the metering container. Troughs carry the excess slurry back into the body of agitated slurry in the tank. The construction prevents coarse foreign matter from entering the metering container.

The nature and advantages of the invention will appear more fully from the following detailed invention and the accompanying drawings illustrating a preferred embodiment.

In the drawings:

Figure 5 is a sectional view taken on the line 5—5 of Figure 2;

Figure 6 is a sectional view on the line 6—6 of Figure 5; and

Figures 7 and 8 are sectional views of the metering container showing one means of varying the amount of slurry measured.

Figure 1:
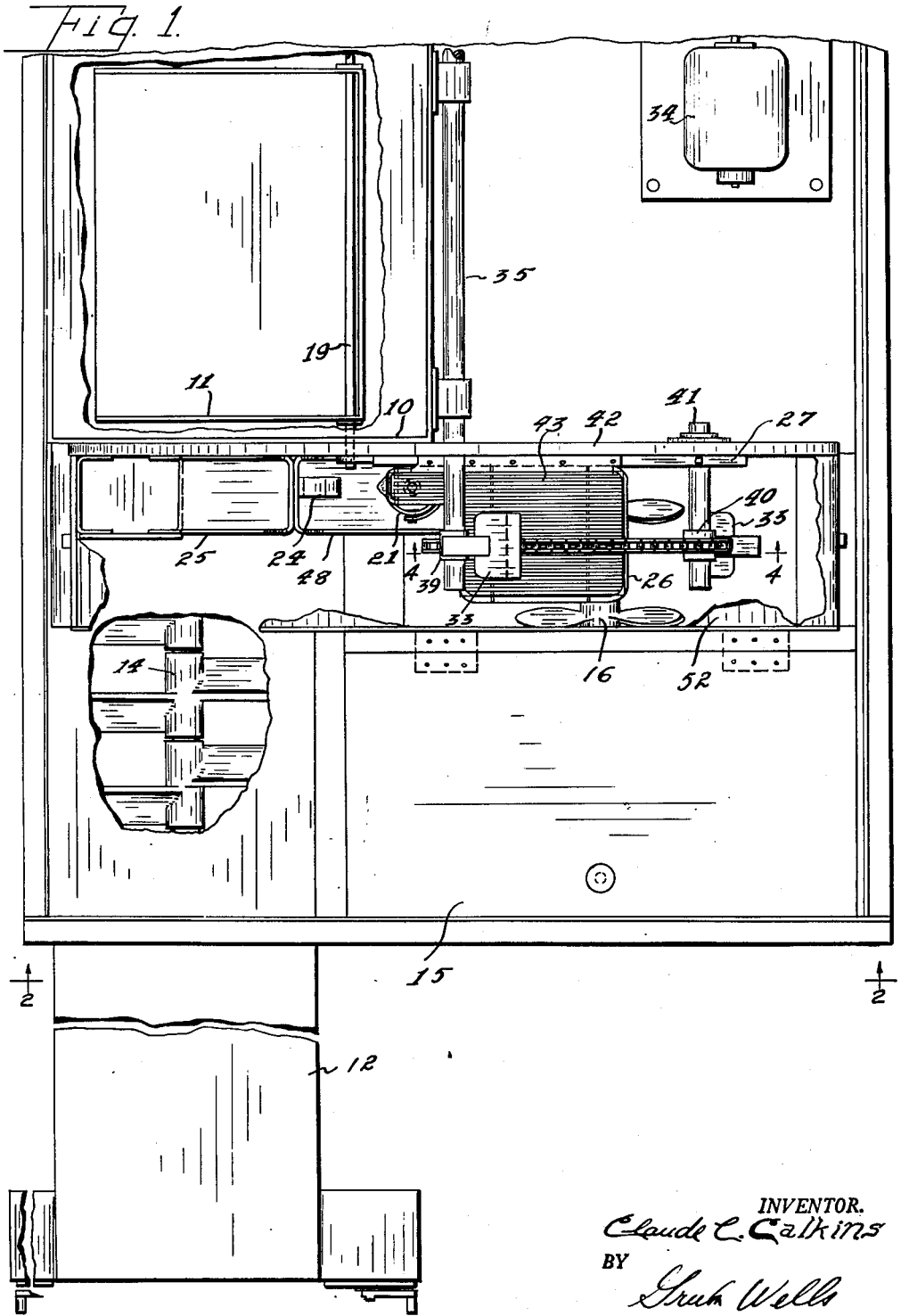
Figure 1 is a plan view, with parts of the housing broken away, of a seed treater constructed according to this invention.

Referring now to the drawings, my invention is shown in connection with a seed treating machine in which the seed is introduced through a housing 10 to a dump pan 11. The dump pan, when loaded, drops the seeds into a mixing trough 12. A shaft 13 in the trough 12 has blades 14 that stir the seeds and move them to the discharge end of the trough. A tank 15 is mounted adjacent to the mixing trough to provide a supply of the seed treating chemical. This tank has an agitator 16 mounted therein. The agitator includes a shaft 16a journalled in suitable bearing blocks 17 and 18 (shown diagrammatically in Figure 5) that are secured to the inner faces of the end walls of the tank 15.

The dump pan 11 is mounted on a rock shaft 19 which also mounts an arm 20, that carries a metering container 21. The container 21 is pivotally supported at the free end of the arm 20 by a yoke 22 on the arm and projections 23 on the container. When the pan 11 drops to the dump position as shown in Figure 3, the container 21 is moved by the arm 20 against a stop 24 and tipped by the stop 24 to pouring position to direct its contents down an inclined trough member 25 that empties into the mixing trough 12.

The present invention provides a new and simple means to supply liquid seed treating material (hereinafter termed slurry), in a continuous stream, to fill the metering container 21 whenever it is situated in the upright or filling position illustrated in Figure 2 of the drawings. A slurry pan 26 is mounted on the end wall of the housing 10 by a bracket 27 and bolts 28 and 29. The pan 26 is provided with a narrow extension 30 that overlies the metering container at filling position and has an outlet at 31. The pan 26 is inclined slightly to the horizontal, being lowest at the outlet 31.

I provide a drive member 32 which rotates the agitator shaft 16 and carries slurry up to the pan 26. The drive member 32 preferably comprises a flexible drive member, such as a sprocket chain, that is operably connected to the shaft 16 and has means to lift slurry from the tank 15 upwardly into the pan 26. This member 32 carries buckets 33 that elevate the slurry to the pan 26. The power to operate the member 32 is obtained from a motor 34 (Figure 1) which drives a shaft 35 by means of a belt 36 and a pulley 37. The motor 34 also drives the mixer shaft 13 in the trough 12 by a belt and pulley arrangement (not shown). The agitator shaft 16 has a wheel 38 fixed thereto and the shaft 35 has a wheel 39 fixed thereto for driving engagement with the member 32. The member 32 extends over the pan 26 and is inclined downwardly from the wheel 39 to a guide wheel 40 that is mounted on a stub shaft 41. The stub shaft 41 is supported by a panel 42 that is secured to the housing 10 to form one wall of a housing for the slurry and dump mechanism.

Figure 2:
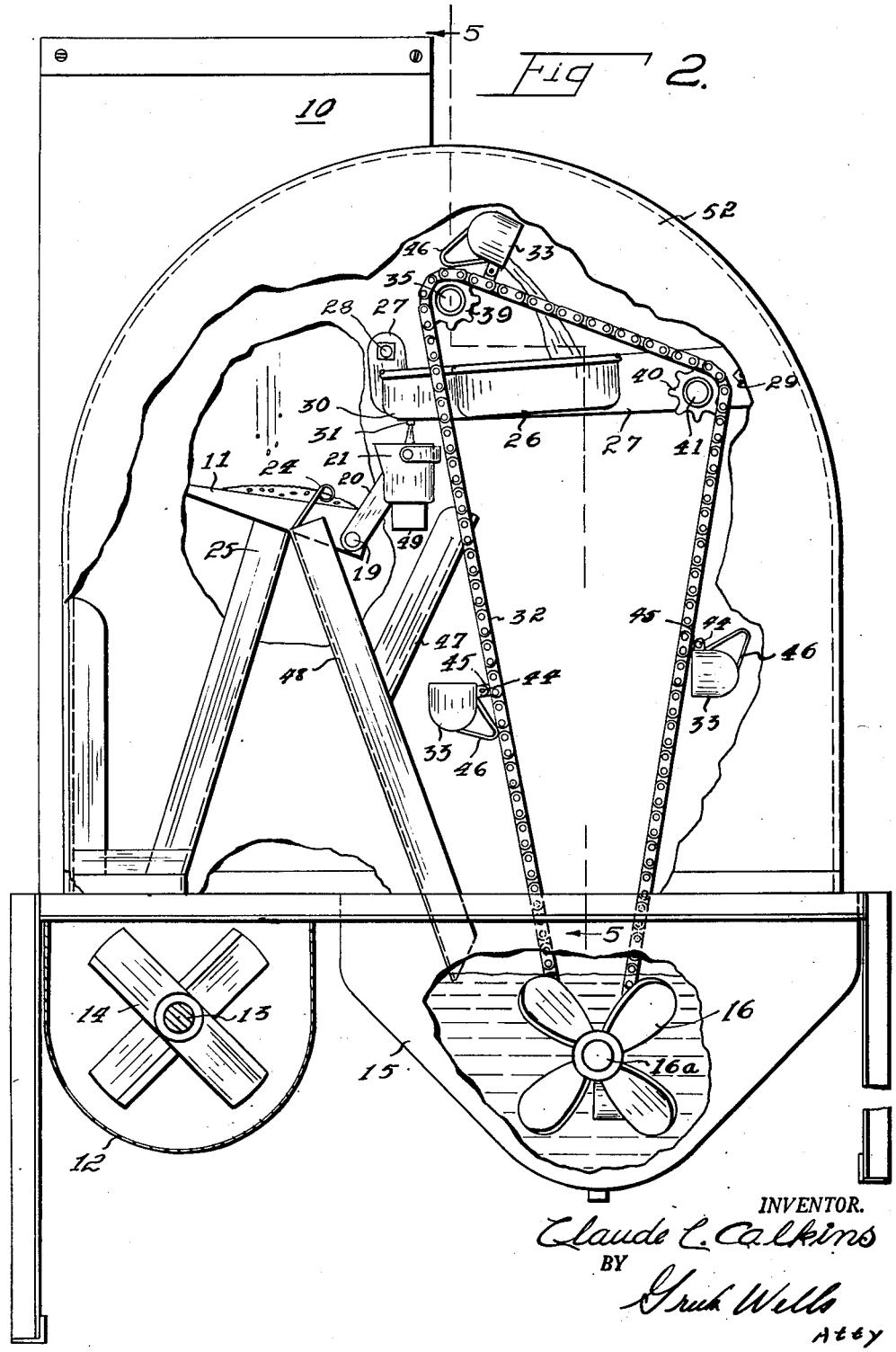
Figure 2 is a sectional view taken on the line 2—2 of Figure 1.
Figure 3:
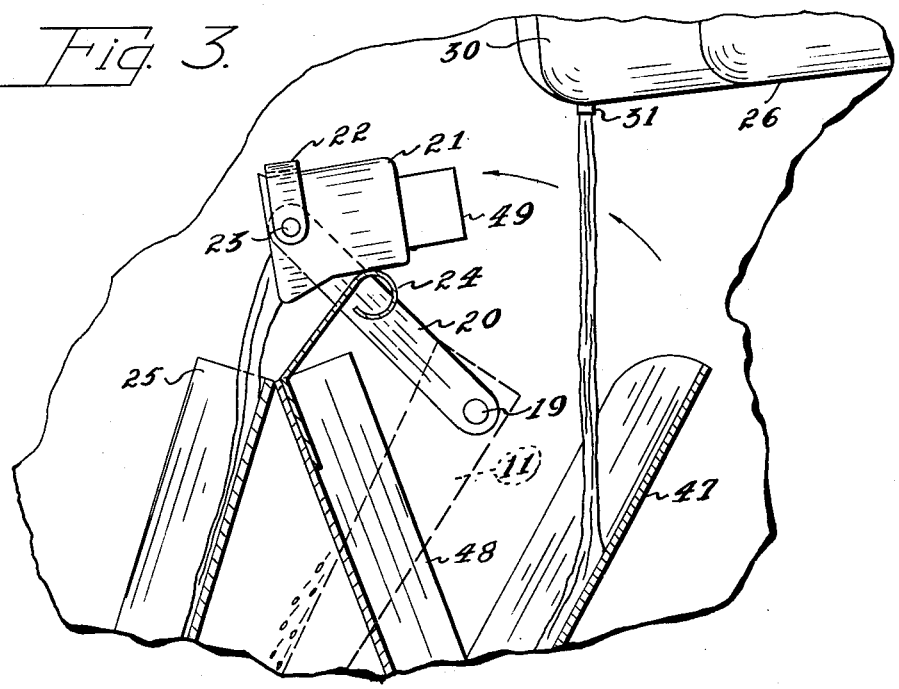
Figure 3 is a fragmentary detailed view of the metering container with the associated parts showing the metering container in dumping position.
Figure 4:
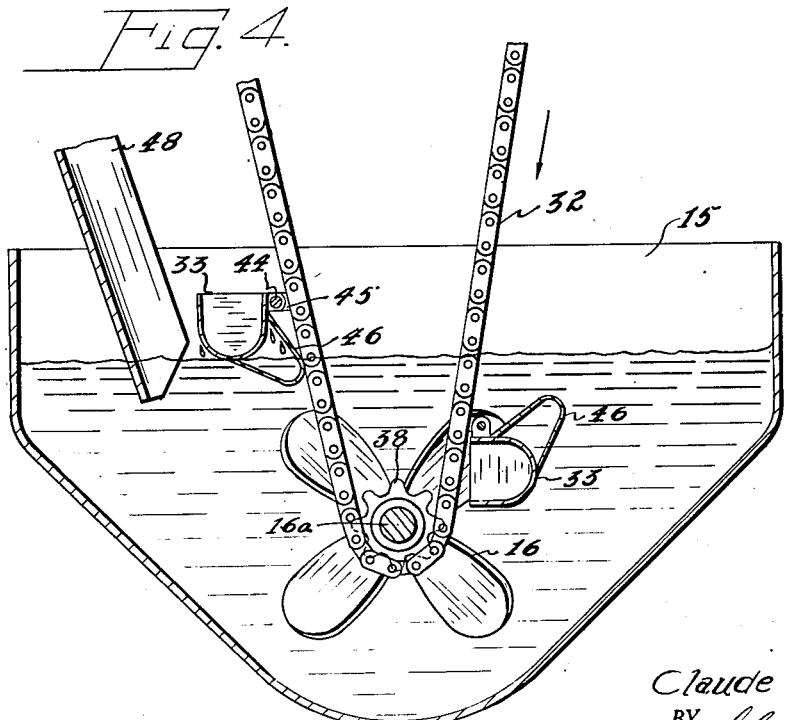
Figure 4 is a fragmentary sectional view taken substantially on the line 4—4 of Figure 1.

Figures 2, 3 and 4 illustrate how the buckets 33 are immersed in the slurry in the tank 15 and carried up to dump their contents in the pan 26. The pan 26 has a screen 43 over the top thereof to prevent any large foreign particles from falling into the pan 26. It will be noted that each bucket 33 has a pivot point at 44 to a connector 45 on the member 32. Also each of the buckets 33 has a projection 46 that extends angularly downwardly and away from the bucket to engage the member 32 and hold the bucket upright on the upward flight of the member 32. As illustrated best by Figure 2 the filled buckets are carried up over the wheel 39 and gradually tipped as they pass over the wheel to pour their contents into the pan 26. The pouring is always away from the outlet 31 so that the slurry flows to the extension 30 and is not dumped into this extension at all.

It should also be noted that the buckets 33 in descending into the slurry in the tank 15 are presented in such a position that the slurry flows easily into the bucket without trapping any air in the bucket to cause added foaming.

The speed at which the chain 32 is driven is such as to supply enough slurry in the pan 26 to maintain a rather steady flow of slurry from the outlet 31. When the metering container 21 is beneath the outlet 31 it will be filled. The arm then raises and moves the metering container laterally out of the path of the stream of slurry before the container 21 is emptied. Excess slurry flows downwardly along a trough 47 into another trough 48 that extends down into the slurry tank 15 substantially to the normal level of slurry kept in the tank. The container 21 is filled to overflowing each time it is held in filling position and the slurry that overflows from the container 21 also finds its way down the troughs 47 and 48 into the tank 15.

The metering container 21 carries a drip blade 49 on the bottom. The blade 49 is secured by a screw 50 that is threaded through the bottom of the container 21.

Figures 7 and 8 of the drawings illustrate one manner in which the capacity of the metering container 21 may be readily varied. A plug 51 of suitable size is inserted in the container 21 and threaded on the screw 50 to restrict the volume of the container 21. The plug 51 shown in Figure 8 fills half the container 21, but of course plugs of different sizes will restrict the capacity of the container 21 to different amounts.

It is believed that the nature of my invention will be clear from the foregoing description. By providing the buckets 33 and the chain 32 to drive the slurry agitator and carry the slurry up to the pan 26, I obtain a simple means for delivering a continuous stream of slurry for filling the metering container 21. The chain 32 and the buckets 32 are made of material capable of withstanding the action of the slurry. The operation of this mechanism for delivering the slurry to the pan 26 is such as to keep the buckets 33 and the chain substantially free of accumulations or deposits of the chemical in the slurry just as the repeated filling and emptying of the container 21 keeps it free of deposits that would seriously affect the accuracy of the measurement of seed treating chemical. The slurry handling mechanism is enclosed by a cover plate 52 which can be readily removed for inspection and cleaning of the mechanism at any time. There are no hoses, pipes, pumps or valves for the slurry to flow through.

Having thus described my invention, I claim:

1. In a machine for treating seeds, a tank for seed treating slurry, an agitator shaft in the tank, agitators on said shaft, a slurry pan having an outlet, a metering cup movable alternately into and out of filling position beneath the outlet from the pan, a flexible drive member extending beneath the shaft and operably connected to said shaft to rotate the shaft, the flexible drive member extending upwardly from the shaft on opposite sides of the pan and extending over the pan, power means for driving the drive member, buckets on said member which are filled with slurry as the member passes beneath the agitator shaft, and means to dump the buckets as they pass over the pan.

2. In a machine for treating seeds, a tank for seed treating slurry, an agitator shaft in the tank, agitators on said shaft, a slurry pan having an outlet, a metering cup movable alternately into and out of filling position beneath the outlet from the pan, a sprocket chain, a sprocket wheel on said shaft, a drive sprocket wheel adjacent to the pan and a second sprocket wheel across the pan from the drive sprocket wheel to guide the chain over the pan, and buckets on said chain.

3. In a machine for treating seeds, a tank for seed treating slurry, an agitator shaft in the tank, agitators on said shaft, a slurry pan having an outlet, a metering cup movable alternately into and out of filling position beneath the outlet from the pan, a sprocket chain, a sprocket wheel on said shaft, a drive sprocket wheel adjacent to the pan and a second sprocket wheel across the pan from the drive sprocket wheel to guide the chain over the pan, and buckets on said chain, the buckets having projections thereon engaging the chain to hold the buckets upright as they travel from tank to pan.

4. In a seed treating machine, a tank for seed treating slurry, an agitator shaft in the bottom portion of said tank, agitator blades on said shaft, a slurry pan spaced above the agitators and having an outlet, a metering cup movable into and out of filling position beneath the pan outlet, a drive shaft above the pan at one side thereof, a guide wheel at the other side of the pan, a flexible drive member extending around the wheel and said shafts and over the pan, means drivingly connecting the flexible drive member to said shafts, whereby to transmit power from said drive shaft to the agitator shaft to operate the agitator blades, and buckets on the flexible drive member which are filled with slurry as the member carries them under the agitator shaft and emptied as the member carries them over the pan between the drive shaft and the guide wheel.

5. In a machine for treating seeds, a tank for seed treating slurry, an agitator shaft in the tank, agitators on said shaft, a slurry pan having an outlet, a metering cup movable alternately into and out of filling position beneath the outlet from the pan, a sprocket chain, a sprocket wheel on said shaft, a drive sprocket wheel adjacent to the pan and a second sprocket wheel across the pan from the drive sprocket wheel to guide the chain over the pan, and buckets on said chain, each bucket having means at one side of its open ends pivotally mounting the bucket to the chain, said bucket also having a projection extending diagonally away from the bucket toward the chain from the closed end thereof operable to engage the chain and hold the bucket upright as it travels from tank to pan.

CLAUDE C. CALKINS.

References Cited in the file of this patent

UNITED STATES PATENTS

| Number | Name | Date |
|---|---|---|
| 797,290 | Kennicott | Aug. 15, 1905 |
| 1,431,659 | Hist | Oct. 10, 1922 |
| 2,295,258 | Cann | Sept. 8, 1942 |

FOREIGN PATENTS

| Number | Country | Date |
|---|---|---|
| 861,571 | France | Nov. 11, 1939 |